United States Patent
Dee

(10) Patent No.: US 7,180,699 B1
(45) Date of Patent: Feb. 20, 2007

(54) METHOD AND APPARATUS FOR INCREASING CAPACITY OF MAGNETIC MEDIA STORAGE

(75) Inventor: Richard H. Dee, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 495 days.

(21) Appl. No.: 10/802,491

(22) Filed: Mar. 17, 2004

(51) Int. Cl.
*G11B 5/02* (2006.01)

(52) U.S. Cl. ........................................ 360/90

(58) Field of Classification Search ............... None
See application file for complete search history.

(56) References Cited

U.S. PATENT DOCUMENTS

| | | | |
|---|---|---|---|
| 5,069,934 A | 12/1991 | Chino et al. | 427/131 |
| 5,293,285 A | 3/1994 | Leonhardt et al. | 360/95 |
| 5,850,328 A | 12/1998 | Leonhardt et al. | 360/134 |
| 6,101,059 A | 8/2000 | Wong et al. | 360/70 |
| 6,767,612 B2 * | 7/2004 | Doushita et al. | 428/842.8 |
| 7,068,464 B2 * | 6/2006 | Dee | 360/90 |
| 2003/0228498 A1 * | 12/2003 | Bradshaw | 428/694 TS |

OTHER PUBLICATIONS

U.S. Appl. No. 10/394,876, filed Mar. 21, 2003, Dee, Double Sided Magnetic Tape.

U.S. Appl. No. 10/115,040, filed Apr. 2, 2002, Todd et al., Method for Packing Tape on a Spool Without Tape Edge Wear.

* cited by examiner

*Primary Examiner*—Hoa Thi Nguyen
*Assistant Examiner*—Mark Blouin
(74) *Attorney, Agent, or Firm*—Brooks Kushman P.C.

(57) ABSTRACT

A method and apparatus for increasing the capacity of magnetic media storage is disclosed. More specifically, an improved two-sided magnetic tape is disclosed. In one implementation, in order to mitigate pack winding problems, a trade-off can be made between the back-coat roughness of a side of the magnetic tape and the mechanical imprint of that roughness in the recording surface of that side (e.g., compromise between roughness and recording density). For example, a recording density and coding scheme deemed appropriate for a relatively large recording head-to-media separation can be used for the "rougher" side of a two-sided tape, and the highest recording density achievable can be used for the "best" or smoothest side of the two-sided tape. Depending on the recording density/roughness match selected, an optimum capacity gain can be selected from a range of capacity gains with values between 1 and 2 (e.g., 1<(gain in capacity)<2). Thus, for relatively slow spooling applications, an optimum recording density/roughness match can be selected with less roughness for the tape surface(s) involved, and for relatively fast spooling applications, an optimum recording density/roughness match can be selected with more roughness for the tape surface(s) involved.

13 Claims, 2 Drawing Sheets

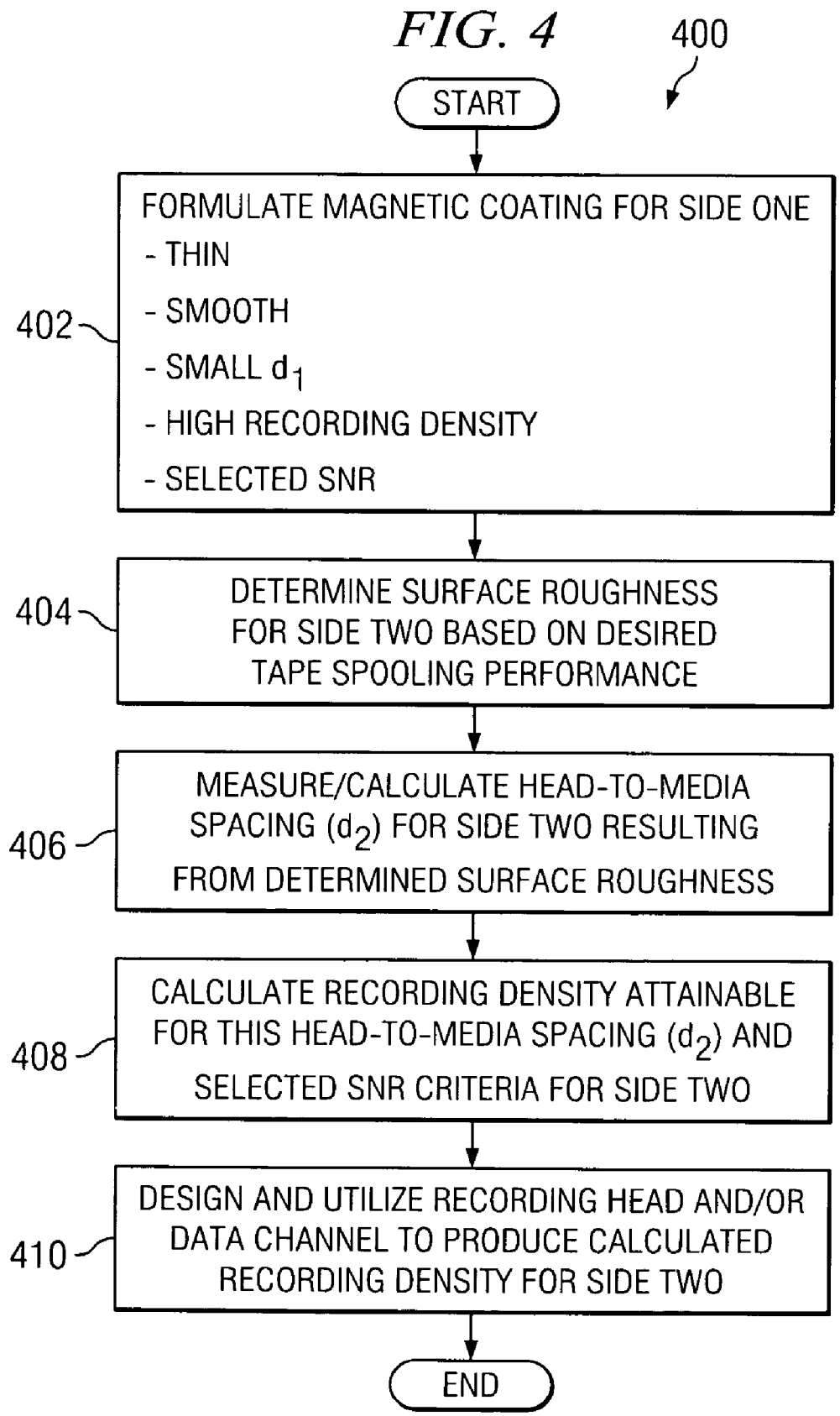

METHOD AND APPARATUS FOR INCREASING CAPACITY OF MAGNETIC MEDIA STORAGE

RELATED APPLICATIONS

The present application is related to commonly assigned, co-pending U.S. patent application Ser. No. 10/394,876 entitled "DOUBLE SIDED MAGNETIC TAPE", filed on Mar. 21, 2003, and Ser. No. 10/115,040 entitled "METHOD FOR PACKING TAPE ON A SPOOL WITHOUT TAPE EDGE WEAR", filed on Apr. 2, 2002, which are hereby incorporated by reference.

BACKGROUND OF THE INVENTION

1. Field of the Invention

The present invention relates generally to high track density, flexible media storage applications, and more specifically, but not exclusively, to a method and apparatus for increasing the capacity of magnetic media storage. More specifically, the present invention provides an improved two-sided magnetic tape.

2. Background of the Invention

Magnetic tape continues to be a popular medium for recording and storing information. For example, magnetic tape storage systems may hold vast quantities of data at a relatively low cost per bit stored. Magnetic tapes are easily manipulated by automated storage systems. Data may be added to information already stored on a magnetic tape. In addition, magnetic tapes may be erased and rerecorded. Furthermore, magnetic tape has a relatively long shelf life under proper storage conditions.

Magnetic tape and tape storage systems may be made increasingly more efficient and cost-effective by increasing the data storage density. Traditionally, increases in storage density have resulted from narrower data tracks, increases in the number of data tracks per tape width, increases in the density of data recorded along the length of each track, etc. These increases have resulted from improvements in the magnetic media, tape thickness, read and record electronics, tape head positioning, data encoding and decoding schemes, etc. However, all of these improvements have focused on the traditional tape configuration of a supportive web coated with magnetic material on one side.

A doubling of information density can be achieved if both sides of the supporting web are coated with magnetic material for recording and retrieving information. However, such two-sided magnetic tape schemes have been considered to be impractical for a number of reasons. For example, one problem with two-sided magnetic tape is related to a phenomenon called "print-through," in which the data written on the media located on one side of the magnetic tape affects the magnetization of the media located on the other side. A related problem is called "contact recording" that can occur when the magnetic tape is spooled up on a reel. In this case, the two sides of the tape are in close proximity or physically touching when the tape is stored, which can cause errant magnetization of the media on either side. The use of a thicker media can help to reduce print-through and/or contact recording, but a thicker media also reduces the volumetric storage capacity of the magnetic tape.

Another problem with two-sided magnetic tape arises during tape spooling operations. Tape pack winding issues can arise with two-sided magnetic tape, because the surface (s) of one or both sides of the tape may be too smooth or too rough. For example, when relatively smooth two-sided magnetic tape is spooled at speed (e.g., with air entrainment), tape slippage (resulting from the relative smoothness of both sides) can cause such problems as stagger wraps, tape edge damage, etc. The use of a rougher surface on one side of the tape can mitigate such problems. Having too rough a surface on one side of a tape typically precludes the use of high-density recording on the magnetic media of the other side due to mechanical imprint/embossing.

Therefore, it would be advantageous to provide an improved two-sided magnetic tape that can increase storage capacity and also mitigate tape pack winding and similar problems.

SUMMARY OF THE INVENTION

The present invention provides a method and apparatus for increasing the capacity of magnetic media storage. More specifically, the present invention provides an improved two-sided magnetic tape. In accordance with a preferred embodiment of the present invention, to mitigate pack winding problems, a trade-off can be made between the back-coat roughness of a side of the magnetic tape and the mechanical imprint of that roughness in the recording surface of that side (e.g., compromise between roughness and recording density). For example, a recording density and coding scheme deemed appropriate for a larger recording head-to-media separation or spacing can be used for the "rougher" side of a two-sided tape, and the highest recording density achievable can be used for the "best" or smoothest side of the two-sided tape. Depending on the recording density/roughness match selected, an optimum capacity gain can be selected from a range of capacity gains having values between 1 and 2 (e.g., 1<(gain in capacity)<2). Thus, for relatively slow spooling applications, an optimum recording density/roughness match can be selected with less roughness for the tape surface(s) involved, and for relatively fast spooling applications, an optimum recording density/roughness match can be selected with more roughness for the tape surface(s) involved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a flowchart illustrating a method for increasing the capacity of a magnetic tape, in accordance with a preferred embodiment of the present invention.

DETAILED DESCRIPTION OF THE PREFERRED EMBODIMENT

Figure 1:
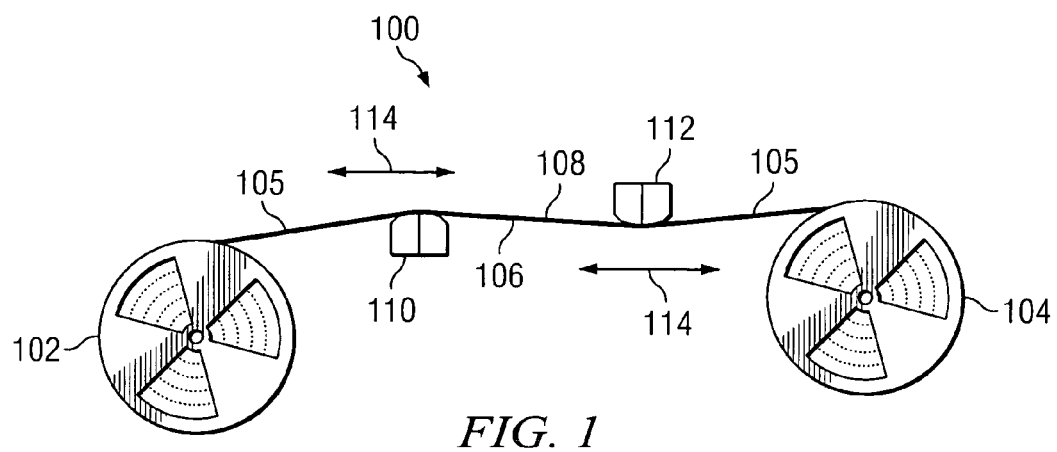
FIG. 1 depicts a diagram illustrating a tape drive system in which the present invention may be implemented.

With reference now to the figures, FIG. 1 depicts a diagram illustrating an exemplary tape drive system in which the present invention may be implemented. For this illustrative example, tape drive system 100 includes tape reels 102, 104. Reels (or spools) 102, 104 can be used for spooling or unspooling two-sided tape media 105 including first side 106 and second side 108. First read/write head 110 is positioned adjacent and in close proximity to first side 106 for reading and writing data from and to a magnetic storage media formed on first side 106. Second read/write head 112 is positioned adjacent and in close proximity to second side 108 for reading and writing data from and to a magnetic storage media formed on second side 108. Rotation of reels 102, 104 clockwise or counter-clockwise moves first side 106 of tape media 105 in a horizontal direction (denoted by arrows 114) past first read/write head 110, and second side 108 in the same horizontal direction past second read/write head 112. For clarity, only pertinent sections and/or components of tape drive system 100 are shown. In this regard, tape drive system 100 shown in FIG. 1 is intended only as an illustrative example, and not as an architectural limitation for the present invention.

Figure 2:
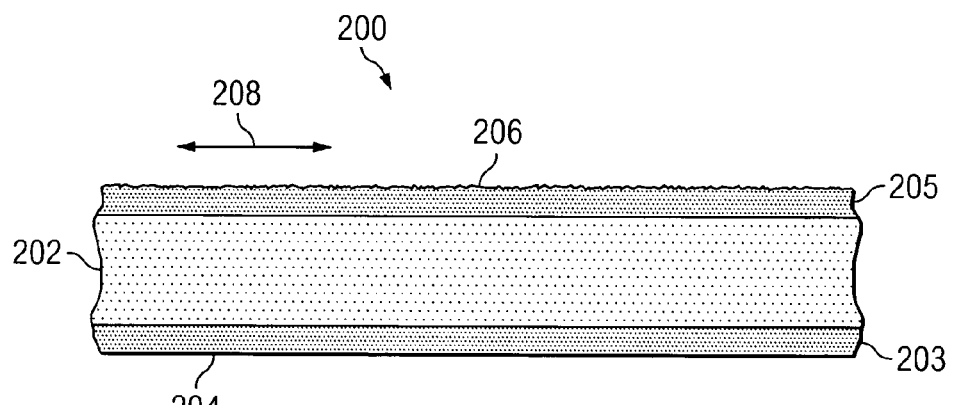
FIG. 2 depicts a pictorial representation of a side view of a two-sided tape that may be used to implement a preferred embodiment of the present invention.

FIG. 2 depicts a pictorial representation of a side view of an exemplary two-sided magnetic tape that may be used to implement a preferred embodiment of the present invention. For example, magnetic tape 200 shown in FIG. 2 may represent tape media 105 shown in FIG. 1. For this illustrative example, magnetic tape 200 includes flexible substrate 202 onto which has been deposited two recording surfaces 204, 206. The two recording surfaces include first magnetic coating 203 on first tape side 204, and second magnetic coating 205 on second tape side 206. During a recording process, regions of magnetization are formed in first magnetic coating 203 and second magnetic coating 205 by a write portion of an adjacent read/write head (e.g., read/write heads 110, 112, respectively, in FIG. 1). Similar to the direction of tape movement in FIG. 1, magnetic tape 200 moves in a horizontal direction (as denoted by arrow 208) relative to the adjacent read/write heads.

Notably, in accordance with the present invention, magnetic tape 200 is formed with recording surfaces 204, 206 having different degrees of roughness. As such, for this exemplary embodiment, first magnetic coating 203 is formed with a smoother surface than second magnetic coating 205. Also, first magnetic coating 203 can be formed as a high-density recording surface, and second magnetic coating 205 can be formed as a medium-density recording surface. In other words, for this exemplary embodiment, first tape side 204 of magnetic tape 200 can have a state-of-the-art (e.g., relatively smooth, thin) surface optimized for high-density recording, and second tape side 206 can have the roughness of its surface degraded for medium-density recording and also to aid or enhance operations of spooling the tape into reels (or spools).

Figure 3:
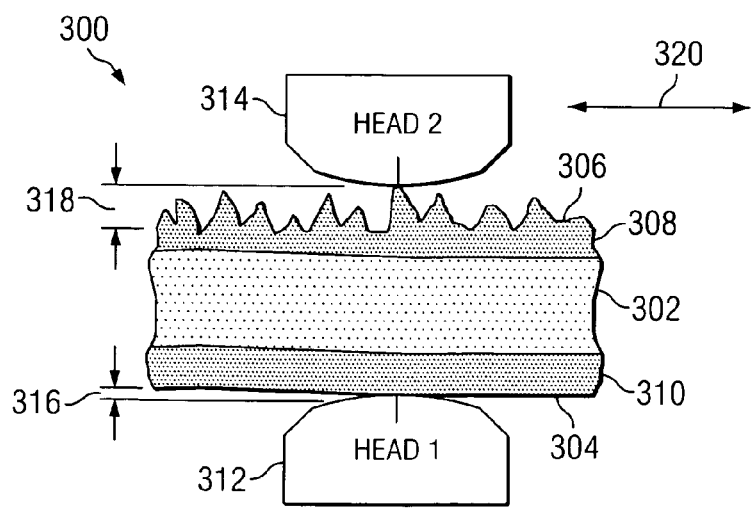
FIG. 3 depicts a partially expanded side view of the two-sided tape depicted in FIG. 2.

FIG. 3 depicts a partially expanded side view of the two-sided tape depicted in FIG. 2. For example, magnetic tape 300 shown in FIG. 3 may represent magnetic tape 200 shown in FIG. 2, with selected portions of magnetic tape 200 expanded for illustrative purposes. For this illustrative example, magnetic tape 300 includes flexible substrate 302 on which has been deposited recording surfaces 304, 306. The two recording surfaces include first magnetic coating 310 on first tape side 304, and second magnetic coating 308 on second tape side 306. First read/write head 312 is positioned adjacent and in close proximity to the recording surface of first tape side 304 (e.g., outer surface of first magnetic coating 310), and second read/write head 314 is positioned adjacent and in close proximity to the recording surface of second tape side 306 (e.g., outer surface of second magnetic coating 308). Coating 308 and 310 can be of single or multi-layer construction.

The distance, $d_1$, or effective (e.g., average or median) spacing between first read/write head 312 and the surface of first magnetic coating 310 is denoted, for this example, as first head-to-media spacing 316. The distance, $d_2$, or effective (e.g., average or median) spacing between second read/write head 314 and the surface of second magnetic coating 308 is denoted, for this example, as second head-to-media spacing 318. Similar to the direction of tape movement in FIGS. 1 and 2, magnetic tape 300 moves in a horizontal direction (as denoted by arrow 320) relative to adjacent read/write heads 312, 314. Notably, for this illustrative example, second head-to-media spacing 318 is greater than first head-to-media spacing 316, because the surface of second magnetic coating 308 has been selected to be rougher than the surface of first magnetic coating 310.

FIG. 4 depicts a flowchart illustrating a method for increasing the capacity of a magnetic tape, in accordance with a preferred embodiment of the present invention. Essentially, a recording density and coding scheme deemed appropriate for a relatively large head-to-media spacing can be used for the "rougher" side of the two-sided tape, and the highest recording density achievable (and as desired) can be used for the "best" or smoothest side of the two-sided tape. Depending on the recording density/roughness match selected, an optimum capacity gain can be selected from a range of capacity gains with values between 1 and 2 (e.g., 1<(gain in capacity)<2). Thus, for relatively slow spooling applications, an optimum recording density/roughness match can be selected with less roughness for the tape surface(s) involved, and for relatively fast spooling applications, an optimum recording density/roughness match can be selected with more roughness for the tape surface(s) involved.

Specifically, referring to FIGS. 3 and 4 for this exemplary embodiment, method 400 begins by a user (e.g., a designer) formulating a magnetic coating to be formed on a supportive web (e.g., flexible substrate 302 in FIG. 3) in order to produce the "best" or smoothest surface on one side of a two-sided magnetic tape (step 402). For illustrative purposes, the "best" side of the two-sided magnetic tape having the "smoothest" surface is referred to hereinafter as "Side 1", and the second side of the two-sided magnetic tape having a "rougher" surface is referred to hereinafter as "Side 2".

Generally, a two-sided magnetic tape may be fabricated by any one of a number of techniques. For example, the flexible substrate can be composed of any appropriate flexible material or coating, such as Polyethylene Teraphalate (PET), Polyethylene Napthalate (PEN), ARAMID, PbO, etc. The substrate can be pulled past a coating head, which injects or deposits an under-layer onto one side of the substrate and a magnetic coating onto the under-layer. The magnetic coating can be composed of magnetic particles mixed with a polymeric binder. The magnetic particles may be filtered to include particles of similar size. The substrate can be pulled past a second coating head, which injects or deposits an under-layer onto the second side of the substrate and a magnetic coating onto that under-layer. A coating process including suitable coating heads for manufacturing two-sided magnetic tape is described in U.S. Pat. No. 5,069,934 to Chino et al., which is incorporated by reference herein.

A coating process for manufacturing two-sided magnetic tape may also include the expelling of magnetic material through a vapor deposition process such as sputtering, evaporation, etc. Also, a coating process for manufacturing two-sided magnetic tape may include, for example, a thin film deposition process for coating one side of the tape, and a particulate application process for coating the second side. In any event, the particular magnetic coating process used for manufacturing a two-sided magnetic tape can vary by application, and should not be considered as an architectural limitation on the present invention.

Table 1 (below) shows parameters with exemplary values that can be used to design and/or fabricate a magnetic coating for each surface of a two-sided magnetic tape (e.g., Side 1 or the surface of first magnetic coating 310, and Side 2 or the surface of second magnetic coating 308 in FIG. 3).

magnetic coating of Side 1 is 3.00E+16 particles $cm^{-3}$, the Recording Wavelength, $\lambda$, is 0.254 microns, and the loss due to spacing, $e^{-kd}$, is 0.227. As such, each parameter listed in the column labeled "Side 1" in Table 1 has a representative value that can satisfy Equation (1).

Next, the user determines a surface roughness needed for Side 2 of the two-sided magnetic tape to produce a desired level of tape spooling performance (step 404). For example, in order to minimize tape pack winding and similar spooling problems, a relatively fast tape spooling operation may require the use of a rougher magnetic coating surface, and a

TABLE 1

Parameters to Produce Lower Density Recording on Side 2 Compared to Side 1 Using SNR Criteria of >24 dB

| Parameter | Side 1 | Side 2 (A) | Side 2 (B) | Side 2 (C) | Side 2 (D) |
|---|---|---|---|---|---|
| Media Particle Density, n, particles $cm^{-3}$ | 3.00E+16 | 2.00E+16 | 1.00E+16 | 5.00E+15 | 2.00E+15 |
| Media Magnetic Coating Thickness, microns | 0.15 | 0.25 | 0.3 | 0.4 | 0.6 |
| Effective spacing due to roughness, d micron | 0.06 | 0.1 | 0.15 | 0.2 | 0.3 |
| Read Track Width, W microns | 4.0 | 4.0 | 4.0 | 4.0 | 8.0 |
| Recording Density, kfci | 200 | 145 | 100 | 70 | 55 |
| Trk Pitch, microns | 10 | 10 | 10 | 10 | 15 |
| Track Density, trks/cm | 1000.0 | 1000.0 | 1000.0 | 1000.0 | 666.7 |
| Track Density, tpi | 2540.0 | 2540.0 | 2540.0 | 2540.0 | 1693.3 |
| Recording Density, frmm | 7874.0 | 5708.7 | 3937.0 | 2755.9 | 2165.4 |
| Recording Wavelength, microns | 0.254 | 0.350 | 0.508 | 0.726 | 0.924 |
| Wavenumber, k $microns^{-1}$ | 24.7 | 17.9 | 12.4 | 8.7 | 6.8 |
| Recording Density, kbpi (PRML) | 396 | 287.1 | 198 | 138.6 | 108.9 |
| SNR (ideal) | 1290.3 | 1636.6 | 1720.4 | 1755.5 | 2274.9 |
| Loss due to spacing, $e^{-kd}$ | 0.227 | 0.166 | 0.156 | 0.177 | 0.130 |
| Areal Density, $Gb/in^2$ | 1.01 | 0.73 | 0.50 | 0.35 | 0.18 |
| SNR (dB) | 24.7 | 24.4 | 24.3 | 24.9 | 24.7 |
| Relative Capacity of each side | 1 | 0.73 | 0.5 | 0.35 | 0.18 |
| Relative Capacity for 2 sides | 2 | 1.73 | 1.5 | 1.35 | 1.18 |

For this exemplary embodiment, the Signal-to-Noise Ratio (SNR) used may be defined as:

$$SNR(dB) = nW\lambda^2 e^{-kd}/6, \quad (1)$$

where the parameter "n" represents the Media Particle Density (particles $cm^{-3}$), "W" represents the Read Track Width (microns), "$\lambda$" represents the Recording Wavelength (microns), "$e^{-kd}$" represents losses due to the head-to-media separation for the tape surface involved, "k" represents the Wavenumber ($microns^{-1}$), and "d" represents the effective head-to-media spacing/separation (microns) due to the roughness of the tape side involved.

Referring to Table 1, Side 1 can be formed with a state-of-the-art thin, smooth magnetic coating (e.g., coating 310) to produce a relatively small, effective head-to-media separation, $d_1$ (e.g., compared to coating 308 of Side 2). Preferably, Side 1 is to be used for high recording density based on the SNR selected to meet the minimum requirements established by the user for reliable data recording. An exemplary minimum SNR criterion of greater than 24 dB has been selected for illustrative purposes. However, the present invention is not intended to be so limited, and any appropriate SNR criterion (e.g., 15 dB, 18 dB, 20 dB, etc.) for a particular two-sided magnetic tape design or application may be used.

For this example, referring to the column labeled "Side 1" in Table 1, in order to satisfy Equation (1) above, a coating thickness of 0.15 microns can produce an effective head-to-media spacing, $d_1$, of 0.06 microns (e.g., thin, smooth surface) for a desired SNR of 24.7 dB. Also, to achieve the desired SNR of 24.7 dB, the media particle density, n, of the relatively slow tape spooling operation may require the use of a smoother magnetic coating surface. The user then calculates or measures the effective head-to-media spacing, $d_2$, which results from the surface roughness selected for Side 2 (step 406).

For example, referring to the column entitled "Side 2(A)" in Table 1, an effective head-to media spacing, $d_2$, of 0.1 microns can be used to produce a desired level of tape spooling performance for a first application. Another exemplary, effective head-to-media spacing, $d_2$, of 0.15 microns can be used to produce a desired level of tape spooling performance for a second application (e.g., referring to the column entitled "Side 2(B)" in Table 1). Still another exemplary, effective head-to-media spacing, $d_2$, of 0.2 microns can be used to produce a desired level of tape spooling performance for a third application (e.g., referring to the column entitled "Side 2(C)" in Table 1). Similarly, yet another exemplary effective head-to-media spacing, $d_2$, of 0.3 microns can be used to produce a desired level of tape spooling performance for a fourth application (e.g., referring to the column entitled "Side 2(D)" in Table 1). At this point, it should be understood that although Table 1 provides a list of exemplary parameter values for four different versions (e.g., 2A–2D) of Side 2 for a two-sided magnetic tape, these values are provided for illustrative purposes and should not be considered as architectural limitations on the present invention.

Considering the desired "roughness" of Side 2, the user calculates a recording density that can be attained with the calculated or measured effective head-to-media spacing, $d_2$, and an SNR criterion desired for reliable data recording for Side 2 (step 408). For example, referring to the column Side 2(A) in Table 1, for a desired SNR criterion of 24.4 dB, and an effective head-to-media spacing, $d_2$, of 0.1 microns, a recording density of 287.1 kbpi may be attained for Side 2. As another example, referring to column Side 2(D) in Table 1, for a desired SNR criterion of 24.7 dB, and an effective head-to-media spacing, $d_2$, of 0.3 microns, a recording density of 108.9 kbpi may be attained for Side 2. The user can then design a recording head and associated data channel to produce the calculated recording density attainable for Side 2 in accordance with the parameter values in Table 1 and/or derived from Equation (1) above (step 410).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Also, it should be understood that specific manufacturing techniques and processes that can be used to fabricate and coat magnetic tapes are known to those of ordinary skill in the art, and that these specific techniques and processes need not be described herein in unnecessary detail in order to enable those of ordinary skill to make and use the present invention.

What is claimed is:

1. A method for increasing the capacity of a magnetic tape, comprising the steps of:
   selecting a first head-to-media spacing for a first side of a magnetic tape;
   forming a first magnetic coating on said first side of said magnetic tape, wherein a distance between a first surface of said first magnetic coating and a first recording head arranged adjacent to said first surface is substantially equal to said first head-to-media spacing;
   selecting a performance value for a second side of said magnetic tape;
   determining a second head-to-media spacing for said second side of said magnetic tape, said second head-to-media spacing associated with said performance value; and
   forming a second magnetic coating on said second side of said magnetic tape, wherein a distance between a second surface of said second magnetic coating and a second recording head arranged adjacent to said second surface is substantially equal to said second head-to-media spacing.

2. The method of claim 1, further comprising the steps of:
   selecting a Signal-to-Noise Ratio (SNR) value for said second side of said magnetic tape; and
   determining a recording density value for said second side of said magnetic tape, said recording density value for said second side of said magnetic tape associated with said SNR value selected for said second side of said magnetic tape and said second head-to-media spacing.

3. The method of claim 1, wherein the magnetic tape comprises a two-sided magnetic tape.

4. The method of claim 1, wherein said first head-to-media spacing is associated with a roughness of said first surface, said second head-to-media spacing is associated with a roughness of said second surface, said roughness of said second surface is greater than said roughness of said first surface, and a recording density value associated with said first surface is larger than a recording density value associated with said second surface.

5. The method of claim 4, wherein said recording density value associated with said first surface comprises a high recording density value, and said recording density value associated with said second surface comprises a medium recording density value.

6. The method of claim 1, further comprising the steps of:
   selecting an SNR value for said second side of said magnetic tape; and
   determining a recording density value for said second side of said magnetic tape, said recording density value for said second side of said magnetic tape associated with said SNR value selected for said second side of said magnetic tape and said second head-to-media spacing, and wherein said SNR value is derived from an equation: $SNR(dB) = n\ W\ \lambda^2\ e^{-kd}/6$.

7. The method of claim 1, wherein said performance value comprises a spooling performance value.

8. A two-sided magnetic tape, comprising:
   means for selecting a first head-to-media spacing for a first side of a magnetic tape;
   means for forming a first magnetic coating on said first side of said magnetic tape, wherein a distance between a first surface of said first magnetic coating and a first recording head arranged adjacent to said first surface is substantially equal to said first head-to-media spacing;
   means for selecting a performance value for a second side of said magnetic tape;
   means for determining a second head-to-media spacing for said second side of said magnetic tape, said second head-to-media spacing associated with said performance value; and
   means for forming a second magnetic coating on said second side of said magnetic tape, wherein a distance between a second surface of said second magnetic coating and a second recording head arranged adjacent to said second surface is substantially equal to said second head-to-media spacing.

9. The two-sided magnetic tape of claim 8, further comprising:
   means for selecting a Signal-to-Noise Ratio (SNR) value for said second side of said magnetic tape; and
   means for determining a recording density value for said second side of said magnetic tape, said recording density value for said second side of said magnetic tape associated with said SNR value selected for said second side of said magnetic tape and said second head-to-media spacing.

10. The two-sided magnetic tape of claim 8, wherein said first head-to-media spacing is associated with a roughness of said first surface, said second head-to-media spacing is associated with a roughness of said second surface, said roughness of said second surface is greater than said roughness of said first surface, and a recording density value associated with said first surface is larger than a recording density value associated with said second surface.

11. The two-sided magnetic tape of claim 10, wherein said recording density value associated with said first surface comprises a high recording density value, and said recording density value associated with said second surface comprises a medium recording density value.

12. The two-sided magnetic tape of claim 8, further comprising:
   means for selecting an SNR value for said second side of said magnetic tape; and
   means for determining a recording density value for said second side of said magnetic tape, said recording density value for said second side of said magnetic tape associated with said SNR value selected for said second side of said magnetic tape and said second head-to-media spacing, and wherein said SNR value is derived from an equation: $SNR(dB) = n\, W\, \lambda^2\, e^{-kd}/6$.

13. The two-sided magnetic tape of claim 8, wherein said performance value comprises a spooling performance value.

* * * * *